US011119677B2

(12) United States Patent
Gu et al.

(10) Patent No.: US 11,119,677 B2
(45) Date of Patent: Sep. 14, 2021

(54) HBM BASED MEMORY LOOKUP ENGINE FOR DEEP LEARNING ACCELERATOR

(71) Applicant: Samsung Electronics Co., Ltd., Suwon-si (KR)

(72) Inventors: Peng Gu, Santa Barbara, CA (US); Krishna T. Malladi, San Jose, CA (US); Hongzhong Zheng, Los Gatos, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 840 days.

(21) Appl. No.: 15/916,228

(22) Filed: Mar. 8, 2018

(65) Prior Publication Data

US 2019/0187898 A1  Jun. 20, 2019

Related U.S. Application Data

(60) Provisional application No. 62/599,534, filed on Dec. 15, 2017.

(51) Int. Cl.
*G06F 3/06* (2006.01)
*G06F 13/38* (2006.01)
*G06N 3/08* (2006.01)

(52) U.S. Cl.
CPC ............ *G06F 3/064* (2013.01); *G06F 3/0604* (2013.01); *G06F 3/0673* (2013.01); *G06N 3/08* (2013.01)

(58) Field of Classification Search
None
See application file for complete search history.

(56) References Cited

U.S. PATENT DOCUMENTS

| 7,055,018 B1 | 5/2006 | Bratt et al. |
| 7,305,540 B1 | 12/2007 | Trivedi et al. |
| 8,890,215 B2 | 11/2014 | Vorbach |
| 9,053,951 B2 | 6/2015 | Bemanian et al. |
| 9,577,644 B2 | 2/2017 | Gao et al. |
| 9,727,113 B2 | 8/2017 | Barry et al. |

(Continued)

FOREIGN PATENT DOCUMENTS

TW   201308545 A1   2/2013

OTHER PUBLICATIONS

Gao, Mingyu, et al., DRAF: A Low-Power DRAM-based Reconfigurable Acceleration Fabric, Stanford University, Samsung Semiconductor Inc., Cornell University, EPFL, 13 pages, Jun. 1, 2016.

(Continued)

*Primary Examiner* — Scott C Sun
(74) *Attorney, Agent, or Firm* — Lewis Roca Rothgerber Christie LLP

(57) ABSTRACT

A storage device and method of controlling a storage device are disclosed. The storage device includes a host, a logic die, and a high bandwidth memory stack including a memory die. A computation lookup table is stored on a memory array of the memory die. The host sends a command to perform an operation utilizing a kernel and a plurality of input feature maps, includes finding the product of a weight of the kernel and values of multiple input feature maps. The computation lookup table includes a row corresponding to a weight of the kernel, and a column corresponding to a value of the input feature maps. A result value stored at a position corresponding to a row and a column is the product of the weight corresponding to the row and the value corresponding to the column.

20 Claims, 5 Drawing Sheets

(56) References Cited

U.S. PATENT DOCUMENTS

2013/0037951 A1    2/2013   Willey et al.
2016/0098200 A1    4/2016   Guz et al.
2016/0379115 A1   12/2016   Burger et al.

OTHER PUBLICATIONS

Chowdhury et al. "Efficient In-Memory Processing Using Spintronics" University of Minnesota, Twin Cities, Computer Architecture Letters, vol. XX, No. X, Sep. 2017, 4 pages.

Kim et al. "Neurocube: A Programmable Digital Neuromorphic Architecture with High-Density 3D Memory" School of Electrical and Computer Engineering, Georgia Institute of Technology, 2016 ACM/IEEE 43rd Annual International Symposium on Computer Architecture, 2016, 13 pages.

Sumbul et al. "A Synthesis Methodology for Application-Specific Logic-in-Memory Designs" Electrical & Computer Engineering Department, Carnegie Mellon University, DAC '15, Jun. 7-11, 2015, San Francisco, CA, USA, 6 pages.

HBM BASED MEMORY LOOKUP ENGINE FOR DEEP LEARNING ACCELERATOR

CROSS-REFERENCE TO RELATED APPLICATION(S)

This U.S. patent application claims priority to and the benefit of U.S. Provisional Application Ser. No. 62/599,534, filed on Dec. 15, 2017, entitled HBM Based Memory Lookup Engine for Deep Learning Accelerator, the entire contents of which is incorporated herein by reference.

BACKGROUND

Machine learning applications including deep neural networks can involve large numbers of operations with significant computation or memory requirements. Accordingly, they may require a large amount of resources to train on different datasets and learn accurately. Other computing applications, including graphics algorithms, are presenting increasing computational and memory requirements. Processing in memory has been used to address some of these concerns by performing computation in memory blocks, rather than in a CPU.

SUMMARY

According to aspects of the present disclosure, a storage device is provided. The storage device includes a host that sends a command to perform an operation utilizing a kernel and a plurality of input feature maps. The kernel includes a plurality of weights, and the input feature maps include a plurality of values. The operation includes determining a product of a first weight of the kernel and a first value of the plurality of values of each of two or more of the plurality of input feature maps. The storage device includes a logic die coupled to the host and configured to receive the command. The storage device also includes a high bandwidth memory (HBM) stack which includes a memory die coupled to the logic die including a memory array. The kernel and the plurality of input feature maps are stored in the memory array. A computation lookup table is stored in the memory array, the computation lookup table having a plurality of rows, a row of the plurality of rows corresponding to one of the plurality of weights of the kernel, the computation lookup table having a plurality of columns, a column of the plurality of columns corresponding to one of the values of the plurality of input feature maps. A result value is stored at a position in the computation lookup table, the position corresponding to a row of the plurality of rows and a column of the plurality of columns, the result value being the product of the weight corresponding to the row and the value corresponding to the column.

In some embodiments, the storage device includes a first row decoder, wherein the memory die enters the first weight into the first row decoder to load the row of the computation lookup table corresponding to the first weight into a row buffer, and a second row decoder, wherein the memory die enters the first weight into the second row decoder to load the first value of each of the two or more of the plurality of input feature maps into an intermediate buffer.

In some embodiments, the storage device includes a column access scheduler and a column decoder, wherein the column access scheduler is configured to receive the first value of each of the two or more of the plurality of input feature maps from the intermediate buffer and, for each first value of each of the two or more of the plurality of input feature maps, to control the column decoder to access the result value at a position in the row buffer corresponding to the column corresponding to the first value, and to output the result value to a read buffer.

In some embodiments, the logic die includes a processing element, wherein the read buffer, upon receiving the result value for each first value in the intermediate buffer, outputs the result value for each first value to the logic die, and the processing element is configured to processes the result value for each first value.

In some embodiments, the processing element is configured to receive the result value corresponding to the first value corresponding to a first input feature map, and is configured to combine the received result value with other received result values for the first input feature map to generate an output value for the first input feature map.

In some embodiments, the host sends a second command to perform a second operation utilizing a second kernel and a second plurality of input feature maps, a second computation lookup table is stored in the memory array, the second computation lookup table having a plurality of rows, a row of the plurality of rows of the second computation lookup table corresponding to one of the plurality of weights of the second kernel, the second computation lookup table having a plurality of columns, a column of the plurality of columns of the second computation lookup table corresponding to one of the values of the second plurality of input feature maps, and a result value is stored at a position in the second computation lookup table, the position corresponding to a row of the plurality of rows and a column of the plurality of columns of the second computation lookup table, the result value being the product of the weight corresponding to the row and the value corresponding to the column.

In some embodiments, the second command is to perform a convolution operation, convolving the second kernel with two or more of the second plurality of input feature maps.

In some embodiments, the command is to perform a matrix multiplication operation, multiplying the kernel with the two or more of the plurality of input feature maps.

In some embodiments, the storage device is configured to store the kernel, the plurality of input feature maps, and the computation lookup table in the memory array based on the command.

In some embodiments, a percentage of the memory array allocated to the computation lookup table is based on the operation identified by the command.

According to another aspect of the present disclosure, a method of controlling a memory device is provided. The method includes sending a command to a logic die to perform an operation utilizing a kernel and a plurality of input feature maps, the kernel including a plurality of weights, the input feature maps including a plurality of values, the operation including determining a product of a first weight of the kernel and a first value of the plurality of values of the two or more of the plurality of input feature maps; storing the kernel and the plurality of input feature maps in a memory array; storing a computation lookup table in the memory array, the computation lookup table having a plurality of rows, a row of the plurality of rows corresponding to one of the plurality of weights of the kernel, the computation lookup table having a plurality of columns, a column of the plurality of columns corresponding to one of the values of the plurality of input feature maps, wherein a result value is stored at a position in the computation lookup table, the position corresponding to a row of the plurality of rows and a column of the plurality of columns, the result value being the product of the weight corresponding to the row and the value corresponding to the column.

In some embodiments, the method includes entering the first weight into a first row decoder to load the row of the computation lookup table corresponding to the first weight into a row buffer, and entering the first weight into a second row decoder to load the first value of the two or more of the plurality of input feature maps into an intermediate buffer.

In some embodiments, the method includes receiving the first value of each of the two or more of the plurality of input feature maps from the intermediate buffer, for each first value of each of the two or more of the plurality of input feature maps, accessing the result value at a position in the row buffer corresponding to the column corresponding to the first value, and outputting the result value to a read buffer.

In some embodiments, the method includes outputting the result value for each first value to the logic die upon receiving the result value for each of the first values in the intermediate buffer, and processing the result value for each first value by a processing element.

In some embodiments, processing by the processing element is receiving the result value corresponding to the first value corresponding to a first input feature map, and combining the received result value with other received result values for the first input feature map to generate an output value for the first input feature map.

In some embodiments, the method includes sending a second command to the logic die to perform a second operation utilizing a second kernel and a second plurality of input feature maps; and storing a second computation lookup table in the memory array, the second computation lookup table having a plurality of rows, a row of the plurality of rows of the second computation lookup table corresponding to one of the plurality of weights of the second kernel, the second computation lookup table having a plurality of columns, a column of the plurality of columns of the second computation lookup table corresponding to one of the values of the second plurality of input feature maps, wherein a second result value is stored at a position in the second computation lookup table, the position corresponding to a row of the plurality of rows and a column of the plurality of columns of the second computation lookup table, the result value being the product of the weight corresponding to the row and the value corresponding to the column.

In some embodiments, the second command is to perform a convolution operation, convolving the second kernel with the two or more of the second plurality of input feature maps.

In some embodiments, the command is to perform a matrix multiplication operation, multiplying the kernel with the two or more of the plurality of input feature maps.

In some embodiments, the method includes storing the kernel, the plurality of input feature maps, and the computation lookup table in the memory array based on the command.

In some embodiments, a percentage of the memory array allocated to the computation lookup table is based on the operation identified by the command.

The above and other aspects of the present disclosure will become more apparent to those skilled in the art from the following detailed description of the example embodiments with reference to the accompanying drawings.

DETAILED DESCRIPTION

Figure 1:
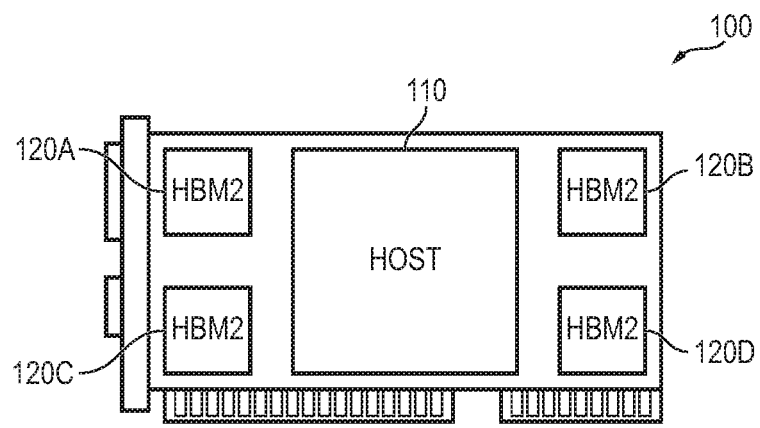
FIG. 1 shows an accelerator card 100 according to embodiments of the present disclosure.

In the following detailed description, only certain exemplary embodiments of the present invention are shown and described, by way of illustration. As those skilled in the art would recognize, the invention may be embodied in many different forms and should not be construed as being limited to the embodiments set forth herein. Descriptions of features or aspects within each exemplary embodiment should typically be considered as available for other similar features or aspects in other exemplary embodiments. Like reference numerals designate like elements throughout the specification.

Figure 2:
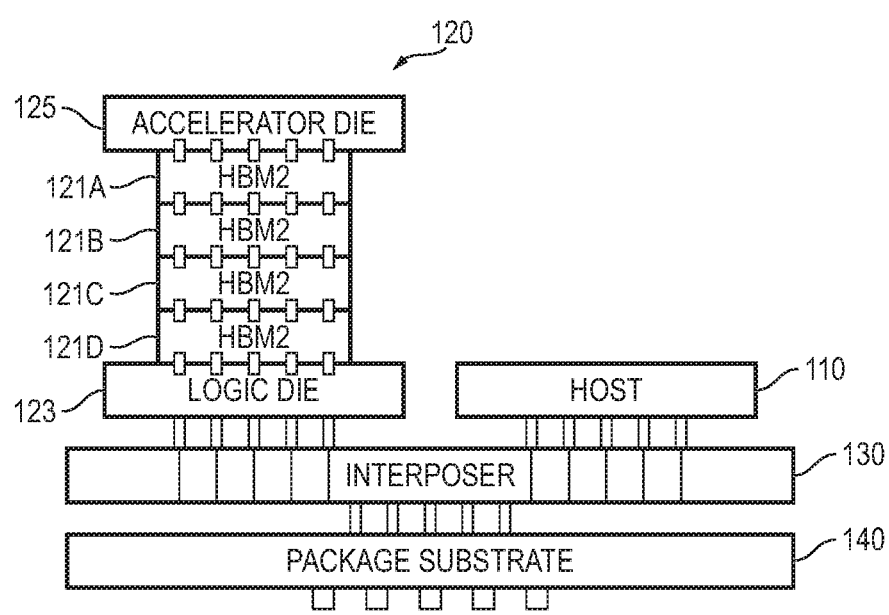
FIG. 2 is a block diagram depicting a side view of the accelerator card 100.

FIG. 1 shows an accelerator card 100 (e.g., a graphics card) according to embodiments of the present disclosure. The accelerator card 100 may utilize a high-bandwidth memory ("HBM") architecture, such as the HBM2 architecture. The accelerator card 100 includes a host 110 and a plurality of memory stacks 120A-D (hereinafter "DRAM stacks"). FIG. 2 is a block diagram depicting a side view of the accelerator card 100. The diagram of FIG. 2 includes one of the DRAM stacks 120. The DRAM stack 120 includes a plurality of memory dies 121A-D (hereinafter "DRAM dies") and a logic die 123. In some embodiments, the DRAM stack 120 may include an accelerator die 125, and the accelerator die 125 may perform operations in cooperation with or in place of the logic die 123.

The host 110 is connected to the logic die 123 through an interposer 130. The interposer 130 may be designed to enable the host 110 to communicate with the plurality of DRAM stacks 120A-D utilizing the HBM architecture. The interposer is connected to the package substrate 140 which may provide an interface between the host 110 and external systems (e.g., the package substrate 140 may include a PCIe connector).

Figure 3:
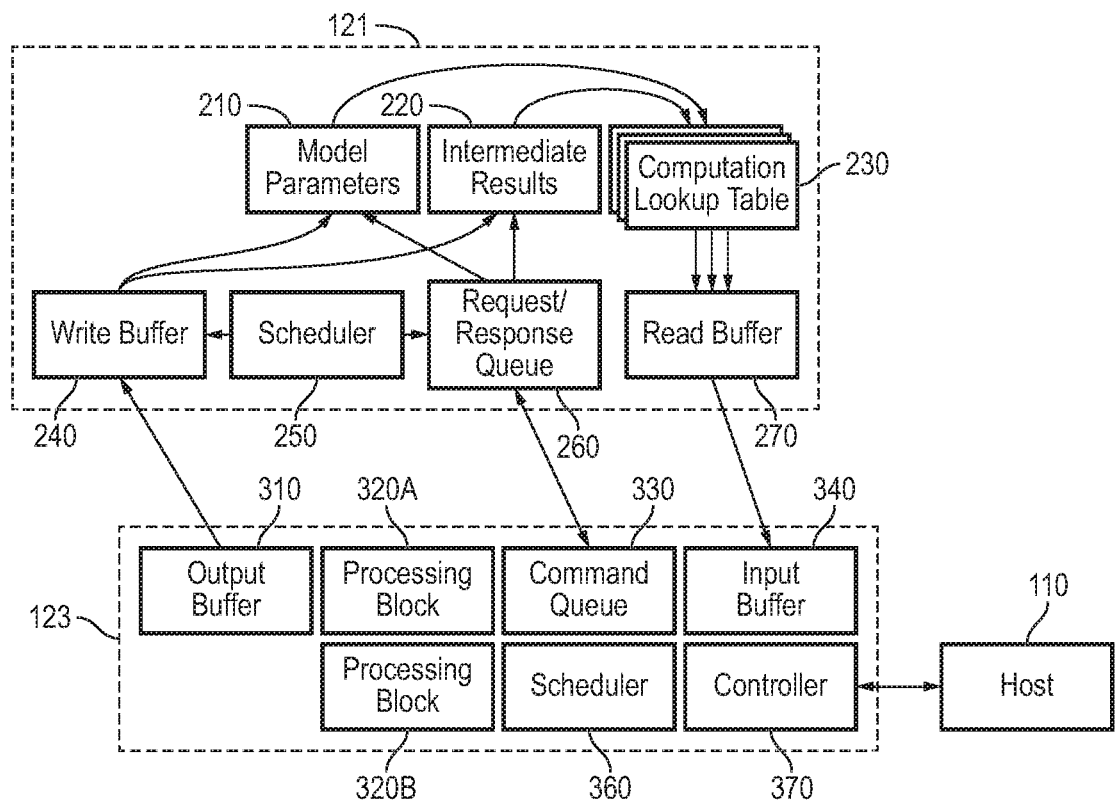
FIG. 3 is a block diagram of a DRAM die 121 and a logic die 123 according to embodiments of the present disclosure.

FIG. 3 is a block diagram of a DRAM die 121 and a logic die 123 according to embodiments of the present disclosure. The DRAM die 121 includes a write buffer 240, a scheduler 250, a request/response queue 260, and a read buffer 270. The DRAM die may include model parameters 210, intermediate results 220, and one or more computation lookup table 230 in one or more memory array. The write buffer 240 and the read buffer 270 serve as input and output points for the DRAM die 121, and the scheduler 250 and the request/response queue control the data flow on the DRAM die 121.

Figure 4:
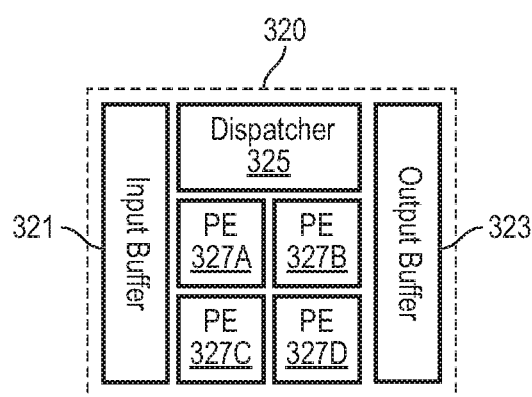
FIG. 4 is an embodiment of a processing block 320 according to embodiments of the present disclosure.

The logic die 123 includes an output buffer 310, one or more processing block 320A-B, a command queue 330, an input buffer 340, a scheduler 360, and a controller 370. FIG. 4 is an embodiment of a processing block 320 according to embodiments of the present disclosure. Referring to FIG. 4, the processing block 320 has an input buffer 321 to temporarily store input values such as the pointwise multiplication results or partial results of convolution or matrix multiplication operations, and an output buffer 310 to temporarily store computation results. The processing block 320 includes a dispatcher 325 and a plurality of processing elements 327A-D. The dispatcher 325 is responsible for transferring the data in the input buffer into processing elements 327A-D and transferring the data from the processing elements 327A-D to the output buffer.

Referring again to FIG. 3, the input buffer 340 and the output buffer 310 of the logic die 123 store data for the logic die 123. The controller 370 is responsible for communicating with the host 110, and the scheduler 360 is responsible for scheduling the computation tasks.

The controller 370 receives commands from the host 110. In response to a command, the controller 370 may instruct the scheduler 360 to schedule tasks based on the content of the command. The scheduler 360 may request that the command queue 330 send pre-computation data to the DRAM die 121. In some embodiments, the pre-computation data may be received from the host 110 with a command. In some embodiments, the pre-computation data is calculated by the logic die 123, for example by the controller 370 based on a command from the host 110. The pre-computation data may include weights for one or more kernel, one or more input feature maps, and/or values for one or more computation lookup table. The DRAM die 121 may temporarily read the pre-computation data from the output buffer 310 to the write buffer 240, and the scheduler 250 may store the pre-computation data in the model parameters array 210 or the intermediate results array 220. The weights for the one or more kernel may be stored in the model parameters array 210, and the plurality of input feature maps can be stored in the intermediate results array 220.

In the computation lookup table 230, values are stored in positions corresponding to rows and columns. Each combination of a row and a column has a position with a value stored at that position. In some embodiments, the host 110 may compute the contents of the computation lookup table 230 and send them to the accelerator card 100. In some embodiments, the computation lookup table may be loaded from host memory. In some embodiments, the host 110 may initiate a program on the logic die 123 so the logic die 123 will calculate the contents of the computation lookup table.

The computation lookup table 230 may be configured to support pointwise processing of pre-configuration values, such as pointwise multiplication. The computation lookup table 230 may include a row corresponding to every possible value for a first set of pre-configuration values (e.g., weights of kernels), and may include a column corresponding to every possible value for a second set of pre-configuration values (e.g., values in input feature maps). The value stored at each position is the product of the value associated with the row and the value associated with the column for that position. To multiply one of the first set of pre-configuration values with one of the second pre-configuration values, the DRAM die 121 may perform a lookup operation on the computation lookup table 230 to find the row corresponding to the value of the one of the first set of pre-configuration values and move that row data to a row buffer. The DRAM die 121 may then perform a column lookup operation on the row data in the row buffer to find the entry for the column corresponding to the value of the one of the second set of pre-configuration values, and may output the value located at that operation to the read buffer 270.

Note that while pointwise multiplication is used above as an illustrative example, the present disclosure is not limited thereto, and other pointwise operations are within the scope of the present disclosure. The operations may include arithmetic (e.g., exponential) operations and/or logical (e.g., XOR) operations. In some embodiments, the DRAM die 121 includes multiple computation lookup tables 230 corresponding to different pointwise operations (or includes multiple rows for each value, one for each pointwise operation, in one computation lookup table 230). For example, in a first computation lookup table 230 the value at each position may correspond to the product of the values corresponding to the row and column for that position, and in a second computation lookup table 230 the value at each position may correspond to the quotient of the values corresponding to the row and column for that position. The scheduler 250 may determine which pointwise operation to perform by scheduling row and/or column access operations in the computation lookup table 230 corresponding to that pointwise operation.

The contents of the read buffer 270 are streamed to the input buffer 340 of the logic die 123. The scheduler 360 may copy the data from the input buffer 340 to the input buffer 321 of a processing block 320, and the processing elements 327A-D of the processing block may perform additional processing on the data and output it to the processing block output buffer 323.

The memory lookup computation on the DRAM die 121 and the accumulation operations in the logic die 123 may be fully overlapped so the hardware is at full utilization and can result in high overall throughput.

In some embodiments, the number of memory arrays or subarrays configured as a computation look up table 230 may be based on the type of command received from the host 110. For commands with a high compute-to-memory ratio, more sub-arrays can be configured as computation look up tables, and for commands with a low compute-to-memory ratio, fewer sub-arrays can be configured as computation look up tables. A compute-to-memory ratio for a kernel may refer to the number of operations (e.g., pointwise operations) per element accessed from the computation lookup table. The ratio of memory subarrays containing computation lookup table data may be OPA*M/N, where OPA is the number of pointwise operations performed per element accessed, M is the number of elements each memory subarray can provide each cycle, and N is the number of pointwise operations each computation lookup table can provide each cycle.

Figure 5:
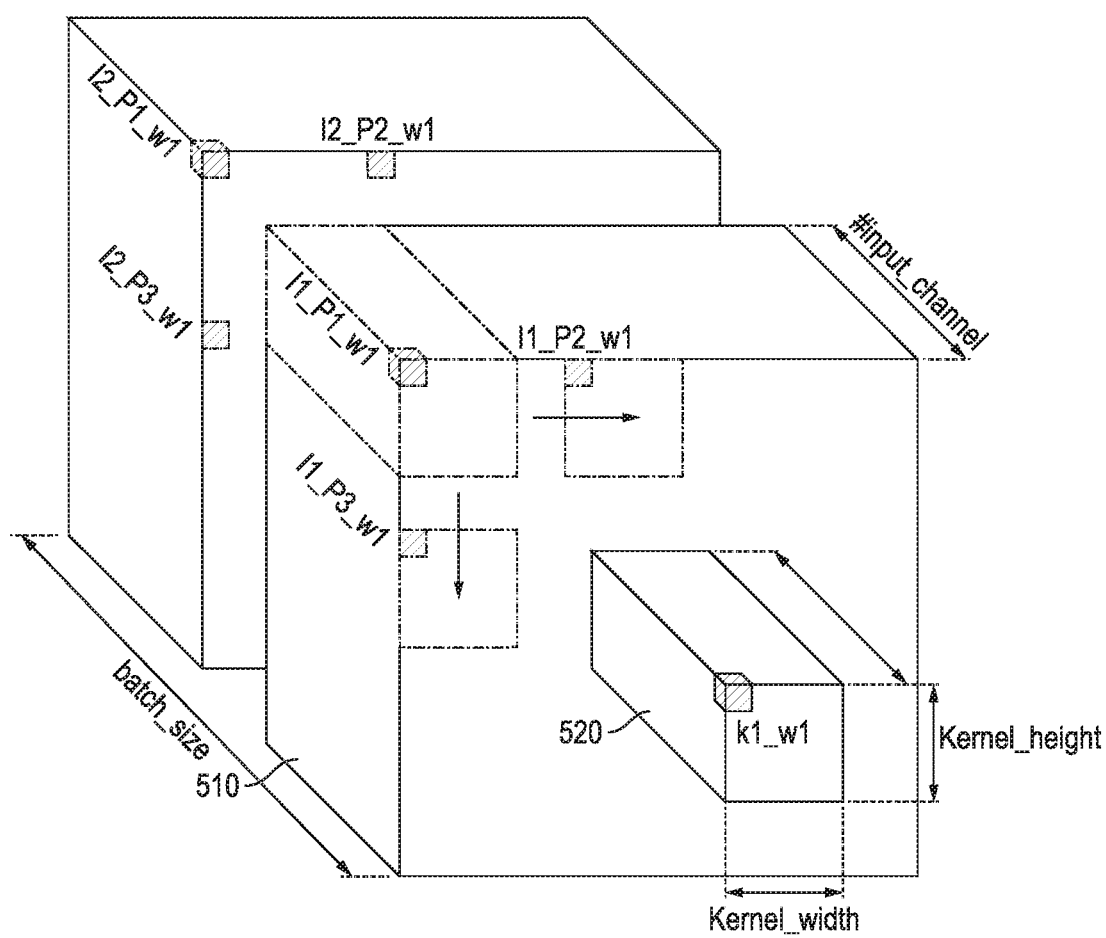
FIG. 5 shows a batched convolution operation according to embodiments of the present disclosure.
Figure 6:
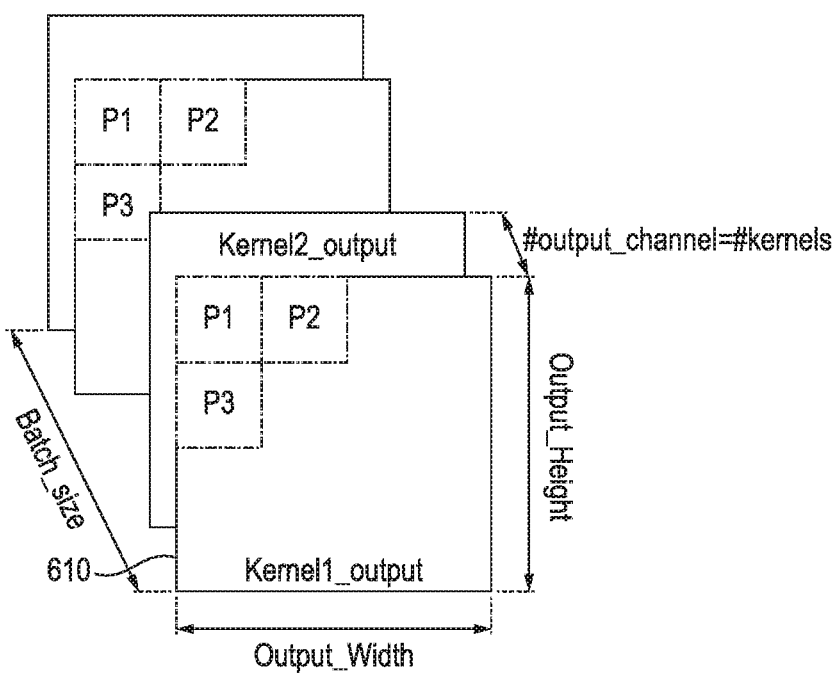
FIG. 6 shows the output of the batched convolution operation of FIG. 5.

FIG. 5 shows a batched convolution operation according to embodiments of the present disclosure. FIG. 6 shows the output of the batched convolution operation of FIG. 5. Referring to FIGS. 5 and 6, the batched convolution operation may be performed by the DRAM stack 120 described above. The host 110 may send a command to the controller 370 instructing it to perform the batched convolution operation utilizing a plurality of input feature maps 510 and one or more kernels 520. The plurality of input feature maps 510 may be stored in the intermediate results memory array 220, and the one or more kernels 520 may be stored in the model parameters array 210. The batch size may be understood to be the number of input feature maps 510. Each input feature map 510 may be a three dimensional array of values having a width, a height, and a depth, and the input channel may be understood to be the depth. The kernel 520 may be a three dimensional array of values having a kernel height which is less than the input feature map height, a kernel width which is less than the input feature map width, and a depth equal to the input feature map depth (i.e. equal to the input channel).

The kernel 520 is applied at multiple positions throughout the input feature map 510, for example in a repeating grid pattern. At each position, weights in the kernel 520 are multiplied with corresponding values of the input feature map 510. The products of each weight at a given position and the corresponding values of the input feature map 510 are added together to get an output value P1, P2, P3, for that position in that input feature map, and the values for each position in a given input feature map 510 are combined to form an output matrix 610 for that input feature map and kernel combination. The process is repeated for each kernel and for each input feature map.

A weight of a kernel may be referred to as kj_wi, where j identifies the kernel and i is the particular position of that weight within the kernel, and a value of an input feature map may be referred to as Ix_Py_wz, where x identifies the input feature map, y is the position of the kernel on the input feature map, and z is the particular position of the value in the input feature map (corresponding directly to i for the kernel). As shown in FIG. 5, the weight k1_w1 corresponds to an illustrated position in the first kernel. In order to generate the output of FIG. 6, the weight k1_w1 is multiplied with each of the values I1_P1_w1, I1_P2_w1, I1_P3_w1, I2_P1_w1, I2_P2_w1, I2_P3_w1, and similar values in each position in each input feature map 510.

Figure 7:
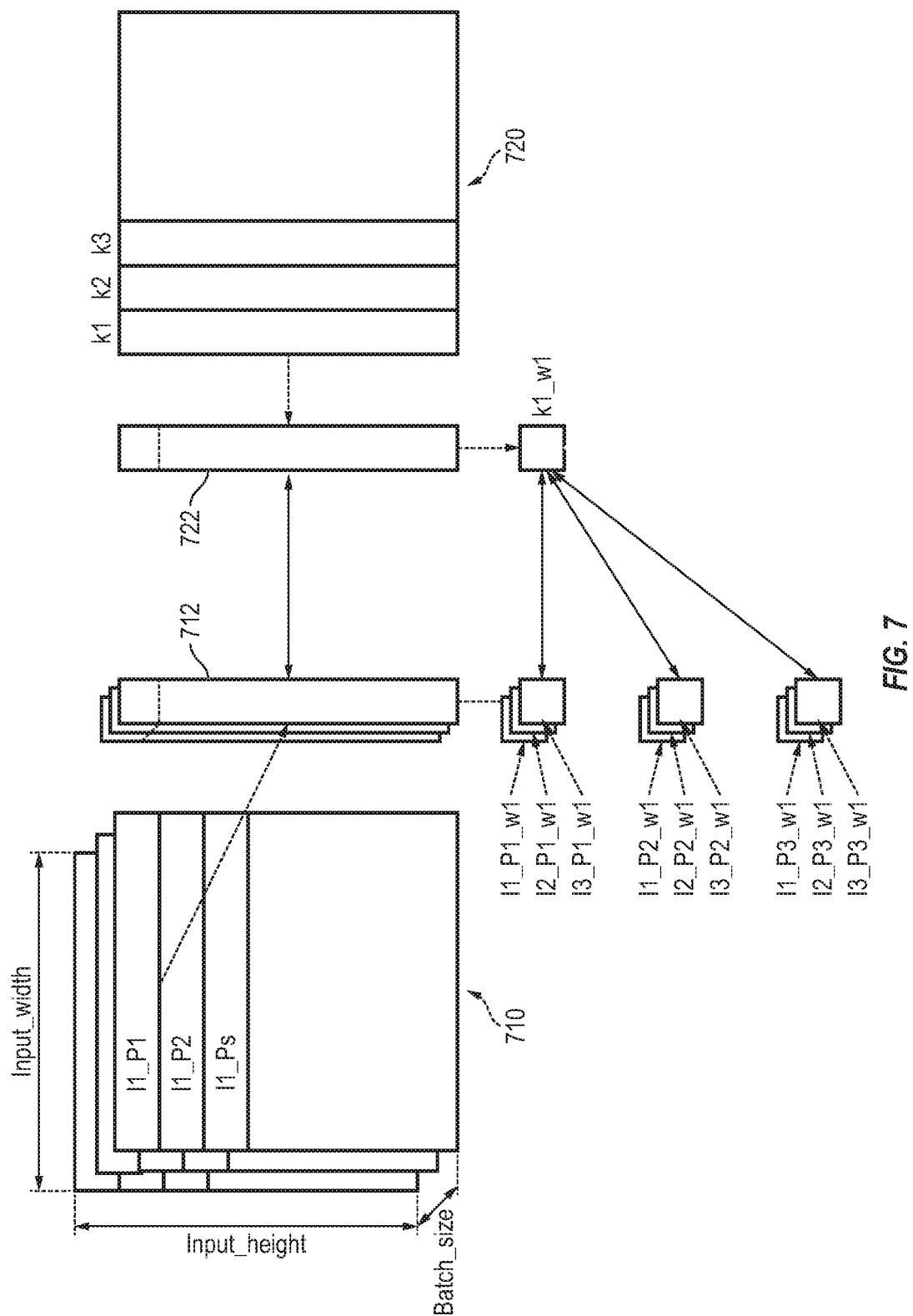
FIG. 7 shows a batched matrix multiplication operation according to embodiments of the present disclosure.

FIG. 7 shows a batched matrix multiplication operation according to embodiments of the present disclosure. The batched matrix multiplication operation may be performed by the DRAM stack 120 described above. The host 110 may send a command to the controller 370 instructing it to perform the batched matrix multiplication operation utilizing a plurality of input feature maps 710 and a one or more kernels 720. The plurality of input feature maps 710 may be stored in the intermediate results 220 memory array 220, and the one or more kernels 720 may be stored in the model parameters memory array 210. The batch size may be understood to be the number of input feature maps 710. Each input feature map 710 may be a two dimensional matrix of values having a width and a height, and may be divided into input rows 712 in the height direction. The kernel 720 may be a two dimensional array of weights having a width and a height, and may be divided into columns in the width direction. The height of the input feature map 710 (and therefore the number of rows) may be equal to the width of the kernel 720 (and therefore the number of columns). To generate an output for a kernel 720, each weight in a column of the kernel 720 may be multiplied with a corresponding value in each row of each input feature map 710. For example, a weight of a kernel may be referred to as kj_wi, where j is the column of the weight and i is the position of the weight in the column, and a value of an input feature map may be referred to as Ix_Py_wz, where x identifies the input feature map, y is the row of the value, and z is the position of the value in the row. As shown in FIG. 7, in order to generate an output for each input feature map 710 in the batch, the weight k1_w1 is multiplied with each of the values I1_P1_w1, I1_P2_w1, I1_P3_w1, I2_P1_w1, I2_P2_w1, I3_P3_w1, I3_P2_w1, I3_P3_w1, and similar values in each position in each row of each input feature map 710.

Figure 8:
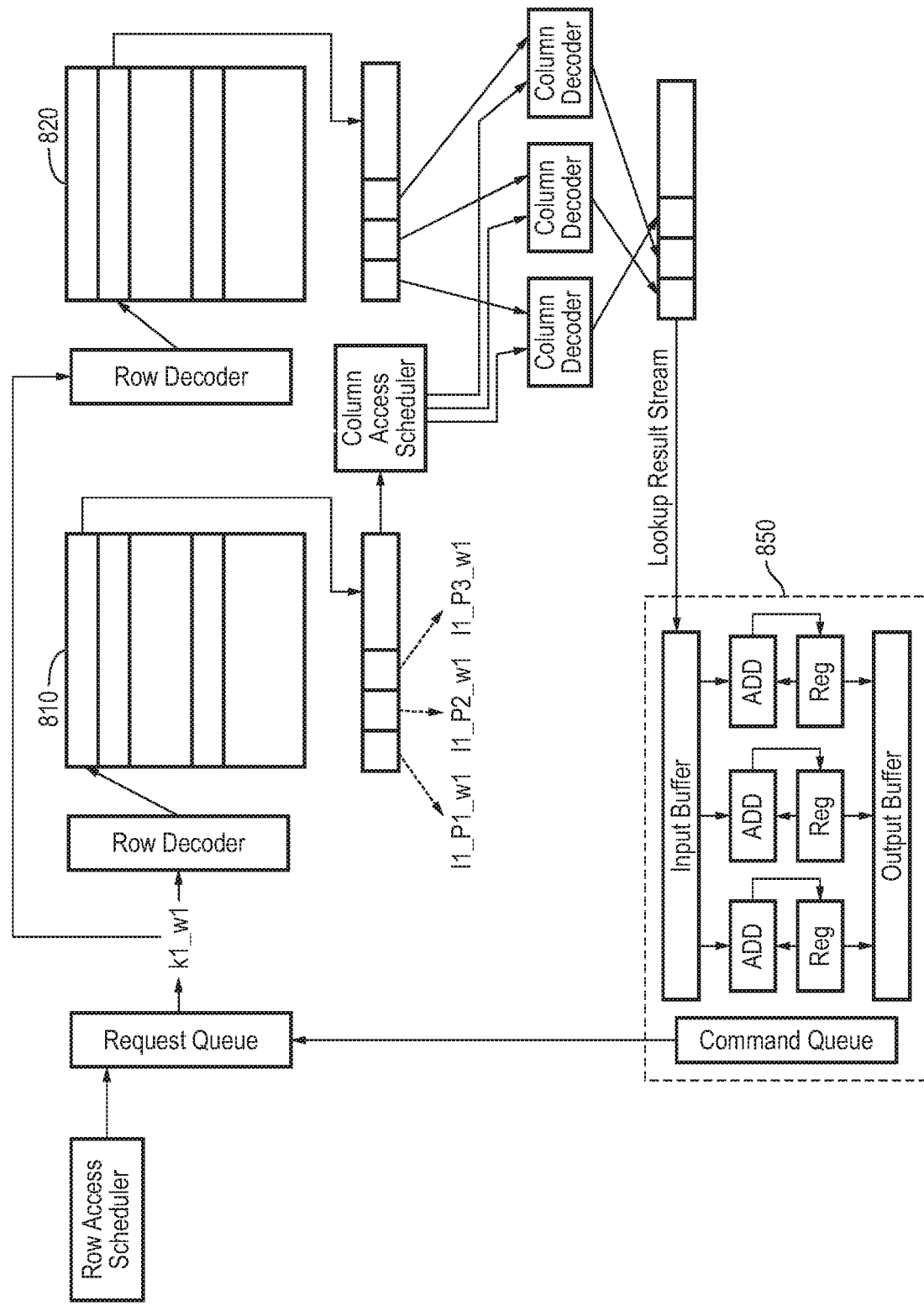
FIG. 8 is a block diagram showing a pointwise operation according to embodiments of the present disclosure.

FIG. 8 is a block diagram showing a processing in memory operation according to embodiments of the present disclosure. In the operation of FIG. 8, an operation is performed on a kernel and a batch of input feature maps. For example, in some embodiments, the input feature maps are three dimensional arrays of values, the kernel is a three dimensional array of weights having a smaller height and width than the input feature map but having the same depth, and the operation is convolving the kernel with the batch of input feature maps. In some embodiments, the input feature maps are two dimensional matrices of values, the kernel is a two dimensional matrix of weights, and the operation is multiplying the kernel matrix with each of the input feature map matrices.

FIG. 8 includes an input feature map table 810 and a computation lookup table 820. The computation lookup table 820 may contain a row corresponding to every possible weight of the kernel, and may include a column corresponding to every possible value in the input feature maps. The value stored at each position is the product of the weight associated with the row and the value associated with the column for that position. The input feature map table 810 includes the values of the batch of input feature maps. Each value associated with an input feature map position that needs to be pointwise multiplied with the same weight position in the kernel may be stored in the same row as indexed by the value of the weight position in the kernel.

A logic die 850 is shown as having a command queue, an input buffer, and output buffer, and several adders ADD and registers. This may be a simplified view for ease of explanation, and the logic die 850 may include other elements, or the elements shown can be more complex than depicted. For example, the input buffer, the output buffer, the adders ADD, and the registers may be for a single processing element of the logic die 850, and the logic die may include several processing elements and/or separate input/output buffers to transmit information to/from the input buffer and output buffer depicted.

The command queue of the logic die 850 sends a request for result values corresponding to a given weight in the kernel—for example, as shown in FIG. 8, a first weight k1_w1. As will be explained further, the result values for a given weight in the kernel are the values generated from multiplying the weight with different input feature maps and/or different positions in one input feature map. In response, a request queue queues a lookup request for the row corresponding to the first weight. Once the row access scheduler indicates that the lookup request for the row corresponding to the first weight should be executed, the first weight (or the value of the row corresponding to the first weight) is passed to a first row decoder for the input feature map table 810 and a second row decoder for the computation lookup table 820. The first row decoder outputs the row of the input feature map table 810 to an intermediate buffer. The values in the row of the input feature map table corresponding to the first weight are the values pulled from various positions in the input feature maps with which the first weight should be multiplied. For example, where the weight is k1_w1, the values may be I1_P1_w1, I1_P2_w1, I1_P3_w1. The second row decoder outputs the row of the computation lookup table 820 to a row buffer. The values in the row of the computation lookup table corresponding to the first weight are all of the possible products of the first weight and the values of the input feature table.

A column access scheduler receives each value in the input buffer. Each value in the input buffer corresponds to a column in the computation lookup table 820. For each value in the input buffer, the column access scheduler communications with a column decoder to output the value stored in the row buffer for the column corresponding to that value (i.e. a result value) to an output buffer. In some embodiments, the column access scheduler communicates with plurality of column decoders to perform the operation in parallel. Because the result values stored in the row buffer are the products of the first weight and respective input feature map values, the columns for the values in the row buffer correspond to the input feature map values, and the values in the intermediate buffer are input feature map values, the result value which is output to the output buffer is the product of the first weight and the input feature map value, and it has been determined in memory without utilizing, e.g., processor resources.

The values stored in the intermediate buffer each need to be multiplied by the first weight. Because the row buffer already contains row values for the first weight, only a column lookup operation needs to be performed to get the result value for each value in the input buffer; separate row lookup operations are not necessary. As a result, the memory lookup may have a high buffer hit rate (or may not perform additional row lookup operations for the first weight value), which may significantly reduce the latency of the operation.

In some embodiments, the output buffer may store each result value until it has received the result value for each value in the intermediate buffer, at which time it may transmit the stored result values to the input buffer of the logic die 850. In some other embodiments, the output buffer may send smaller sets of result values or may continuously stream result values to the input buffer of the logic die 850.

The logic die 850 may further process the result values to generate an output for each input feature map for the operation. For example, the input buffer may take each result value for a given row in an input feature map (where the input feature map is a matrix), or for a given position in an input feature map (where the input feature map is a three dimensional array) and pass those result values to a separate adder ADD. The adder may increase the value stored in a register accordingly. Once every value for the input feature map has been processed with respect to the respective weights in the kernel, the register may contain a value necessary for calculating the output for each input feature map, such as the value of one entry of an output matrix for an input feature map. The register may output this value, and the logic die and/or the host may combine or further process the output from each register to generate the output value for each input feature map.

In the drawings, the relative sizes of elements, layers, and regions may be exaggerated and/or simplified for clarity. Spatially relative terms, such as "beneath," "below," "lower," "under," "above," "upper," and the like, such as describing lines of a display "above" or "below" a line, or pixels "left" or "right" of other pixels, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present invention.

The terminology used herein is for the purpose of describing particular embodiments and is not intended to be limiting of the present invention. As used herein, the singular forms "a" and "an" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an example or illustration.

The electronic or electric devices and/or any other relevant devices or components according to embodiments of the present invention described herein, such as the source and/or the display device, may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the exemplary embodiments of the present invention.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

What is claimed is:

1. A storage device comprising:
a host that sends a command to perform an operation utilizing a kernel and a plurality of input feature maps, the kernel comprising a plurality of weights, the input feature maps comprising a plurality of values, the operation comprising determining a product of a first weight of the kernel and a first value of the plurality of values of each of two or more of the plurality of input feature maps;
a logic die coupled to the host and configured to receive the command; and
a high bandwidth memory (HBM) stack comprising a memory die coupled to the logic die comprising a memory array, wherein:
the kernel and the plurality of input feature maps are stored in the memory array,
a computation lookup table is stored in the memory array, the computation lookup table having a plurality of rows, a row of the plurality of rows corresponding to one of the plurality of weights of the kernel, the computation lookup table having a plurality of columns, a column of the plurality of columns corresponding to one of the values of the plurality of input feature maps, and
a result value is stored at a position in the computation lookup table, the position corresponding to a row of the plurality of rows and a column of the plurality of columns, the result value being the product of the weight corresponding to the row and the value corresponding to the column.

2. The storage device of claim 1, further comprising:
a first row decoder, wherein the memory die enters the first weight into the first row decoder to load the row of the computation lookup table corresponding to the first weight into a row buffer, and
a second row decoder, wherein the memory die enters the first weight into the second row decoder to load the first value of each of the two or more of the plurality of input feature maps into an intermediate buffer.

3. The storage device of claim 2, further comprising:
a column access scheduler and a column decoder, wherein the column access scheduler is configured to receive the first value of each of the two or more of the plurality of input feature maps from the intermediate buffer and, for each first value of each of the two or more of the plurality of input feature maps, to control the column decoder to access the result value at a position in the row buffer corresponding to the column corresponding to the first value, and to output the result value to a read buffer.

4. The storage device of claim 3, wherein the logic die comprises a processing element, wherein the read buffer, upon receiving the result value for each first value in the intermediate buffer, outputs the result value for each first value to the logic die, and the processing element is configured to processes the result value for each first value.

5. The storage device of claim 4, wherein the processing element is configured to receive the result value corresponding to the first value corresponding to a first input feature map, and is configured to combine the received result value with other received result values for the first input feature map to generate an output value for the first input feature map.

6. The storage device of claim 1, wherein:
the host sends a second command to perform a second operation utilizing a second kernel and a second plurality of input feature maps,
a second computation lookup table is stored in the memory array, the second computation lookup table having a plurality of rows, a row of the plurality of rows of the second computation lookup table corresponding to one of the plurality of weights of the second kernel, the second computation lookup table having a plurality of columns, a column of the plurality of columns of the second computation lookup table corresponding to one of the values of the second plurality of input feature maps, and
a result value is stored at a position in the second computation lookup table, the position corresponding to a row of the plurality of rows and a column of the plurality of columns of the second computation lookup table, the result value being the product of the weight corresponding to the row and the value corresponding to the column.

7. The storage device of claim 6, wherein the second command is to perform a convolution operation, convolving the second kernel with two or more of the second plurality of input feature maps.

8. The storage device of claim 1, wherein the command is to perform a matrix multiplication operation, multiplying the kernel with the two or more of the plurality of input feature maps.

9. The storage device of claim 1, wherein the storage device is configured to store the kernel, the plurality of input feature maps, and the computation lookup table in the memory array based on the command.

10. The storage device of claim 9, wherein a percentage of the memory array allocated to the computation lookup table is based on the operation identified by the command.

11. A method of controlling a memory device, the method comprising:
sending a command to a logic die to perform an operation utilizing a kernel and a plurality of input feature maps, the kernel comprising a plurality of weights, the input feature maps comprising a plurality of values, the operation comprising determining a product of a first weight of the kernel and a first value of the plurality of values of the two or more of the plurality of input feature maps;
storing the kernel and the plurality of input feature maps in a memory array;
storing a computation lookup table in the memory array, the computation lookup table having a plurality of rows, a row of the plurality of rows corresponding to one of the plurality of weights of the kernel, the computation lookup table having a plurality of columns, a column of the plurality of columns corresponding to one of the values of the plurality of input feature maps,
wherein a result value is stored at a position in the computation lookup table, the position corresponding to a row of the plurality of rows and a column of the plurality of columns, the result value being the product of the weight corresponding to the row and the value corresponding to the column.

12. The method of claim 11, further comprising:
entering the first weight into a first row decoder to load the row of the computation lookup table corresponding to the first weight into a row buffer, and entering the first weight into a second row decoder to load the first value of the two or more of the plurality of input feature maps into an intermediate buffer.

13. The method of claim 12, further comprising:
receiving the first value of each of the two or more of the plurality of input feature maps from the intermediate buffer,
for each first value of each of the two or more of the plurality of input feature maps, accessing the result value at a position in the row buffer corresponding to the column corresponding to the first value, and
outputting the result value to a read buffer.

14. The method of claim 13, further comprising:
outputting the result value for each first value to the logic die upon receiving the result value for each of the first values in the intermediate buffer, and
processing the result value for each first value by a processing element.

15. The method of claim 14, wherein processing by the processing element is receiving the result value corresponding to the first value corresponding to a first input feature map, and combining the received result value with other received result values for the first input feature map to generate an output value for the first input feature map.

16. The method of claim 11, further comprising:
sending a second command to the logic die to perform a second operation utilizing a second kernel and a second plurality of input feature maps; and
storing a second computation lookup table in the memory array, the second computation lookup table having a plurality of rows, a row of the plurality of rows of the second computation lookup table corresponding to one of the plurality of weights of the second kernel, the second computation lookup table having a plurality of columns, a column of the plurality of columns of the second computation lookup table corresponding to one of the values of the second plurality of input feature maps,
wherein a second result value is stored at a position in the second computation lookup table, the position corresponding to a row of the plurality of rows and a column of the plurality of columns of the second computation lookup table, the result value being the product of the weight corresponding to the row and the value corresponding to the column.

17. The method of claim 16, wherein the second command is to perform a convolution operation, convolving the second kernel with the two or more of the second plurality of input feature maps.

18. The method of claim 11, wherein the command is to perform a matrix multiplication operation, multiplying the kernel with the two or more of the plurality of input feature maps.

19. The method of claim 11, further comprising storing the kernel, the plurality of input feature maps, and the computation lookup table in the memory array based on the command.

20. The method of claim 19, wherein a percentage of the memory array allocated to the computation lookup table is based on the operation identified by the command.

* * * * *